United States Patent [19]
Craig et al.

[11] Patent Number: 5,223,989
[45] Date of Patent: Jun. 29, 1993

[54] DATA DETECTION CIRCUIT HAVING A PULSE SHAPE AND AMPLITUDE MEASURING SAMPLING DETECTOR

[75] Inventors: John W. Craig, Anaheim Hills, Calif.; Kenneth R. Burns, Nederland, Colo.

[73] Assignee: Storage Technology Corporation, Louisville, Colo.

[21] Appl. No.: 691,389

[22] Filed: Apr. 25, 1991

[51] Int. Cl.⁵ .......................... G11B 5/09; G11B 27/19
[52] U.S. Cl. ........................................... 360/46; 360/39
[58] Field of Search ................ 360/26, 28, 29, 39, 360/46, 51, 52; 375/120

[56] References Cited

U.S. PATENT DOCUMENTS

| | | | |
|---|---|---|---|
| 4,297,737 | 10/1981 | Andresen et al. | 360/135 |
| 4,581,567 | 4/1986 | Yanagawa et al. | 318/696 |
| 4,590,526 | 5/1986 | Laatt et al. | 360/78 |
| 4,596,981 | 6/1986 | Ueno et al. | 340/825.2 |
| 5,166,838 | 11/1992 | Fuji et al. | 360/46 |

*Primary Examiner*—David Mis
*Attorney, Agent, or Firm*—Duft, Graziano & Forest

[57] ABSTRACT

The data detection circuit includes a sampling detector which measures both the shape and amplitude of the incoming pulse signal. This apparatus determines the amplitude of the read signal at a plurality of points in time and produces a signal indicative of the presence of recorded data if the measured amplitudes match predetermined thresholds. The predetermined thresholds are used in three measurements: determination that the amplitude of the read signal at one point in time exceeds a predetermined threshold; a determination that the amplitude of the read signal at the one point in time concurrently exceeds the amplitude of the read signal at two other points in time both before and after the one point in time. Also included in this apparatus is a clock generation circuit that produces a clock signal based upon the indication of the presence of recorded data so that the indication of the recorded data and the generation of the clock signal occur in a single channel.

31 Claims, 3 Drawing Sheets

DATA DETECTION CIRCUIT HAVING A PULSE SHAPE AND AMPLITUDE MEASURING SAMPLING DETECTOR

FIELD OF THE INVENTION

This invention relates to data storage systems and, in particular, to apparatus for reading data from a magnetic storage media during on track and slightly off track conditions.

PROBLEM

It is a problem in the field of data storage systems to read data accurately from a magnetic storage media during slightly off track conditions. Data storage systems, particularly computer systems, write data magnetically onto a series of adjacent tracks on a magnetic storage media such as rotating disks or moving tape. On a rotating disk magnetic storage media, the data storage tracks are concentrically arranged and the number of tracks on the disk surface depends on the diameter of the disk. When the magnetic storage media is a magnetic tape, the data storage tracks are arranged along the length of the tape and can number from seven to eighteen tracks across the width of the tape.

Information is stored on the magnetic storage media by orienting the magnetic field of the media in accordance with the data along a selected data storage track. In order to read data stored on a disk, the read/write head or transducer is positioned over a selected track such that the rotation of the spinning disk passes the magnetic field pattern of the media across the head. The read/write head senses the changes in orientation of the magnetic field of the media and generates a read signal which reflects such changes in orientation. Access to each of the concentric data storage tracks is achieved by moving the read/write head radially across the surface of the rotating disk. When reading data stored on a magnetic tape, the tape is passed over an array of stationary read/write heads, where there is one head per data storage track.

Ideally, when a head is positioned over a desired track, data is read by detecting the changes in magnetic field orientation of the media along the length of the track and generating a signal that is representative of such changes in magnetic field orientation. The read signal so generated is typically a pulse shaped signal that has either a positive or negative amplitude depending on the sensed changes in magnetic field orientation of the magnetic storage media. The data is read most accurately from the magnetic storage media when the read/write head is positioned directly over the center of a data storage track. A major portion of the total noise picked up or sensed by the read/write head comes from the data track itself. As the read/write head moves away from the center of a particular data storage track (an off track condition) detection of noise existing between the data storage tracks can take place and some undesired signal can be picked up from adjacent data storage tracks. Also, as the distance of the read/write head from the track center increases, the magnitude of the signal resulting from the detection of the changes in magnetic field orientation of the data storage track decreases in magnitude. The read signal in an off track condition includes noise together with the weaker signal resulting from the increased distance of the read/write head from the center of the data storage track. The noise can obscure the pulse shaped signal and cause misreading of the information stored on the selected data storage track. In order to reduce the effect of this problem, track following apparatus is typically provided to minimize the mispositioning of the read/write head from the center of a particular data storage track. The accuracy with which a particular data storage track must be followed is a function of many factors, one of which is the detection circuit used to process the read data signal. This prior art read signal processing has been achieved by the use of a differentiating detector circuit. In such circuits, the time derivative of the read signal is used to locate the position of the peak of each read pulse to a discrete time interval. However, differentiating detectors enhance the noise with respect to the signal by the very nature of their operation, thereby making data detection more difficult and prone to error.

U.S. Pat. No. 4,590,526, issued May 20, 1986 to Richard J. Laatt, et al. discloses the use of a differentiating detector which detects the pulse position and polarity from the read signal. The pulse detecting circuit disclosed in the Laatt patent incorporates two threshold detectors and two differentiators. Each threshold detector determines whether the read signal pulse exceeds a predetermined signal amplitude. The differentiators are used to identify the position of the pulse peak. The combined output of the threshold detectors and differentiators is provided to the logic circuitry as an indication of the detection by the read/write head of a positive or negative pulse of a predetermined minimum amplitude.

U.S. Pat. No. 4,581,567, issued Apr. 6, 1986 to Yoshihiko Yanagawa, et al. discloses a track following device which incorporates a conventional signal reproducing system consists of a magnetic head, a preamplifier, a demodulator circuit, and a disk drive controller. Timing or track following signals are detected by providing the output of the preamplifier and demodulating circuit to a peak detection circuit and a sector detection synchronizing circuit. The output of the peak detection circuit is stored until a maximum value is obtained, which indicates a position of the head over a track.

U.S. Pat. No. 4,297,737, issued Oct. 27, 1981 to Rolf Andresen, et al. discloses apparatus wherein the output of a limiter is provided in parallel to a detecting circuit and to a phase locked oscillator. The phase locked oscillator is said to serve as a master oscillator, wherein the output of the limiter acts to synchronize the phase lock oscillator.

Synchronization of signals in other digital data circuits has been achieved through either a similar parallel arrangement or the utilization of an independently generated clock signal. For example, U.S. Pat. No. 4,596,981, issued Jun. 24, 1986 to Shoji Ueno, et al. discloses an apparatus for synchronizing data read from optical disks. The Ueno device generates a synchronizing clock signal from the digital signal produced from the optical disk and the synchronizing clock signal is demodulating to a desired signal format. The demodulated signal is provided in parallel to a clock reproducing circuit and a shift register. The clock reproducing circuit is shown to include in series an edge detector, a tank circuit and a phase locked loop.

SOLUTION

The above described problems are solved and a technical advance achieved in the art by the data detection circuit which provides significantly more off-track read capability and which is capable of processing a read signal having poorer signal to noise ratio than prior data detection circuits were capable of handling. This data detection circuit includes a sampling detector which measures both the shape and amplitude of the incoming pulse signal. This apparatus determines the amplitude of the read signal at a plurality of points in time and produces a signal indicative of the presence of recorded data if the measured amplitudes exceed predetermined thresholds. The predetermined thresholds are used in three measurements: determination that the amplitude of the read signal at one point in time exceeds a predetermined threshold; a determination that the amplitude of the read signal at the one point in time concurrently exceeds the amplitude of the read signal at two other points in time, one before and the other after the first point in time. This data detection circuit verifies that the read signal has a true local extremum. Also included in this apparatus is a clock generation circuit, connected to the output of the sampling detector, that produces a synchronized clock signal based upon the indication of the presence of recorded data so that the indication of the recorded data and the generation of the clock signal occur in a single channel.

DETAILED DESCRIPTION

Figure 1:
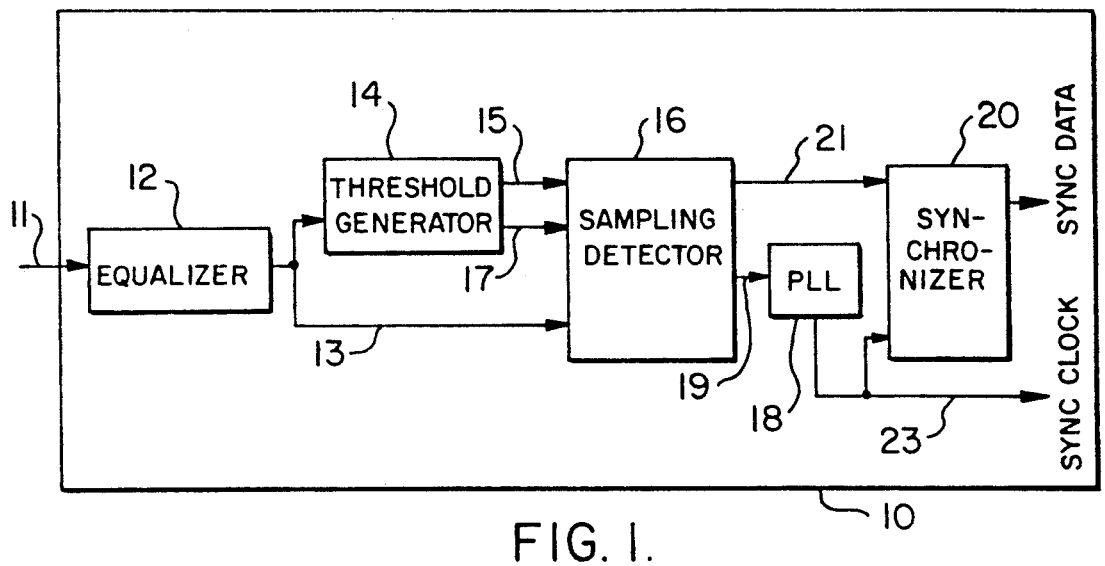
FIG. 1 is a block diagram of the data detector circuit having a pulse shape and amplitude measuring sampling detector.

FIG. 1 illustrates a data detection circuit 10 that includes the sampling detector 16 of the present invention. This data detection apparatus 10 is connected via lead 11 to a read/write head (not shown) which senses the changes in magnetic field orientation of a selected data storage track of a magnetic storage media and generates a read signal which reflects such a change. The read signal obtained from the read/write head is input on lead 11 to the data detection circuit 10. Equalizer 12 mitigates the effect of playback or read channel noise from the read signal on lead 11 and also alters any asymmetry in the pulse shaped waveform to create a symmetrical pulse shaped waveform which is then output as an equalized pulse waveform of the cosine power family. The equalized read signal is concurrently applied by lead 13 to threshold generator 14 and sampling detector 16. Threshold generator 14 produces dynamic threshold voltages that are output on leads 15 and 17 to sampling detector 16. Sampling detector 16 makes use of the dynamic threshold voltages received on leads 15 and 17 as well as the equalized read signal on lead 13 to determine when a valid data pulse has been received from the read/write head on lead 11. When a valid pulse is detected by sampling detector 16, an output pulse signal is applied both to leads 19 and 21. The output pulse on lead 19 is received by phase locked loop 18 where it is used to adjust the frequency and phase of the clock signal produced by phase locked loop 18. The output clock signal produced by phase locked loop 18 is applied on lead 23 to synchronizer 20 which also receives the pulse input on lead 21 from sampling detector 16. Synchronizer 20 functions to produce a data pulse that is synchronized with the clock signal on lead 23. Thus, synchronizer 20 responds to the pulse signal on lead 21 as an enable signal which causes synchronizer 20 to output a synchronized data pulse on lead SYNC DATA as soon as phase locked loop 18 outputs the next consecutive clock pulse on lead 23. Thus, the data detection circuit 10 makes use of a single signal channel arrangement to monitor the input read data applied by the read/write head on lead 11 and produces both a clock signal that is synchronized to the input data stream as well as synchronized data pulses indicative of the presence of data in the data storage track as read by the read/write head.

Equalizer Circuit

Equalizer 12 is a well known element found in prior art peak detection devices, and sophisticated equalizers are found in modems in the field of data communications. Equalizer 12 converts the pulse shaped input waveform received on lead 11 into the shape illustrated in FIG. 5 such that the amplitude of the equalized read signal is symmetric in time around the point t equals zero. The equalized read signal has an amplitude where the combined effect of noise ad intersymbol interference is minimized for all sampling times, which equal plus or minus alpha times k, where k equals two, three, etc. This is the optimum design approach for a linear equalizer, however performance can be improved by using decision feedback or providing a nonlinear design. The variable alpha is selected to be an integer devisor of the clock period of the system which was utilized to write the data onto the magnetic data storage media. In the preferred embodiment of FIG. 1, the variable alpha is chosen to be equal to one-third the data recording clock period. Since the rate at which the data is detected is somewhat variable, it is desirable to synchronize sampling detector 16 with the rate at which data is received on lead 11. In order to insure that sampling detector 16 samples at the appropriate sample times of k times alpha where k equals zero, plus or minus one, plus or minus two, etc., the equalized read signal is applied directly to sampling detector 16.

Threshold Generator

Threshold generator 14 receives the equalized read signal from equalizer 12 on lead 13 and tracks the envelope of the equalized read signal to provide an attenuated level of the envelope to sampling detector 16. Threshold generator 14 passes the envelope signal through a pair of attenuators contained therein and outputs positive and negative threshold signals on leads 15 and 17 respectively. The need for positive and negative thresholds is due to the fact that the pulse shaped waveform received on lead 11 has either a positive or a negative polarity depending on the change in orientation of the sensed magnetic field on the magnetic storage media.

Sampling Detector Measurements

Sampling detector 16 therefore receives positive and negative thresholds on leads 15 and 17, respectively, from threshold generator 14 and the equalized read signal on lead 13 from equalizer 12. Using these three received signals, sampling detector 16 performs a series of measurements on the received equalized read signal to determine the presence or absence of a valid data pulse in the read signal. The equalized read signal is in the shape illustrated in FIG. 5, wherein the pulse shaped signal recorded on the magnetic data storage media has been distorted by the data writing and reading processes into a curved shape having a peak and sloping sides. The measurements performed by sampling detector 16 consist of measuring the amplitude of the received read signal at three points in time which times are noted on FIG. 5 as A, B and C. These times correspond to a narrow window within which the input waveform is scrutinized. A valid data pulse is determined when the magnitude of the received equalized read signal at time B is greater than a predetermined threshold noted on FIG. 5 as $V_{TH}$. In addition, the magnitude of the received equalized read signal at times A and C must be less than the magnitude of the received equalized read signal as measured at time B. These three measurements provide an indication that the input received equalized read signal is greater than a minimum allowable threshold and that the shape of the input signal approximates that of the waveform illustrated on FIG. 5. The pulse illustrated in FIG. 5 has a positive polarity and the positive threshold is used to test it. This pulse can also have a negative polarity for which a negative threshold is used as a test.

There are a number of ways of accomplishing the above described measurements within sampling detector 16 and these are disclosed below. Once sampling detector 16 determines that a valid data pulse signal has been received, it outputs a pulse on leads 19 and 21 to indicate the presence of a valid data signal. This pulse signal is output to phase locked loop 18 which generates a clock signal that is locked to the center of the data window. Although locked, the data window signal and the clock signal are synchronized by use of synchronizer 20. Synchronizer 20 functions to output a data pulse in response to the enable signal on lead 21 and the concurrent occurrence of a clock signal output by phase locked loop 18 on lead 23. Therefore, the data signal appearing on lead SYNC DATA is synchronized with the clock signal appearing on lead 23 and appears only at the time when sampling detector 16 identifies the presence of a valid data pulse on lead 11.

Alternative Data Detection Circuit Architecture

Figure 2:
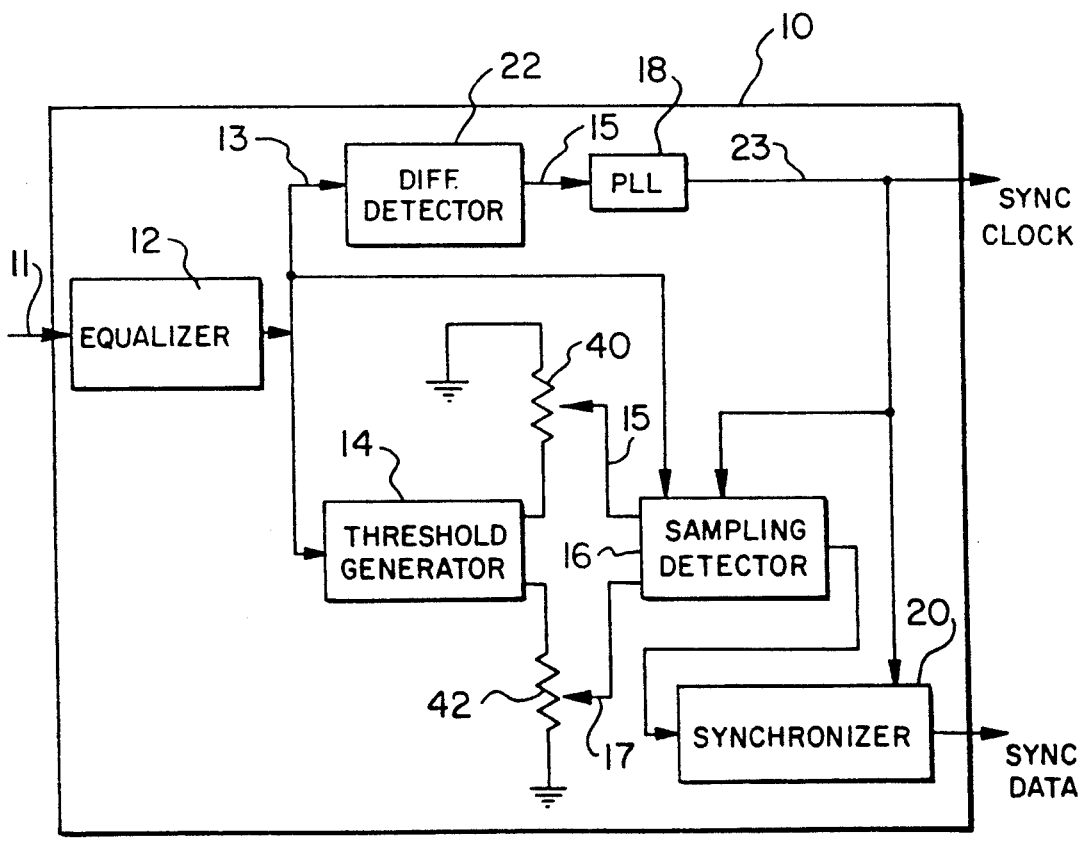
FIG. 2 is a block diagram of an alternative architecture for the data detector circuit using the same sampling detector.

FIG. 2 illustrates an alternative embodiment of the data detection circuit 10. In this apparatus, a differentiating detector 22 has been added to provide a parallel signal path. Differentiating detector 22 serves to detect data peaks in the equalized read signal that appears on lead 13 and outputs an appropriate pulse signal as a result of such detection. Therefore, instead of sampling detector 16 providing synchronization signals for phase locked loop 18, differentiating detector 22 performs that function so that the phase lock loop 18 produces the clock frequency which frequency is increased or decreased by the operation of differentiating detector 22.

It should be noted that phase locked loop 18 generates a clock signal having a frequency approximately three times the recording channel clock frequency. This clock signal frequency is increased or decreased by phase locked loop 18 dependent upon the frequency of the signal output from differentiating detector 22. Thus, the output from differentiating detector 22 can be viewed as controlling the phase of the clock signal generated by phase locked loop 18. The signal generated by differentiating detector 22 is dependent upon data in the read signal and the clock signal produced by phase locked loop 18 is therefore "locked" to the detection of the data and a single path data and clock recovery channel is implemented.

A difficulty with the dual path approach of FIG. 2 is that precise timing of the circuitry is critical. The circuit delays involved in the equalized read signal traversing differentiating detector 22 and phase locked loop 18 must be equal to the circuit delays in the equalizer read signal traversing threshold generator 14 and sampling detector 16 in order for the circuit to operate in proper phase synchronization. This is due to the fact that the clock from one path is used to sample and detect data which is transmitted along the second path and different delays in the two paths can cause a phase error. Therefore, the dual path approach requires the addition of well-known circuitry to compensate for this fixed delay difference.

Sampling Detector Detailed Description

Figure 3:
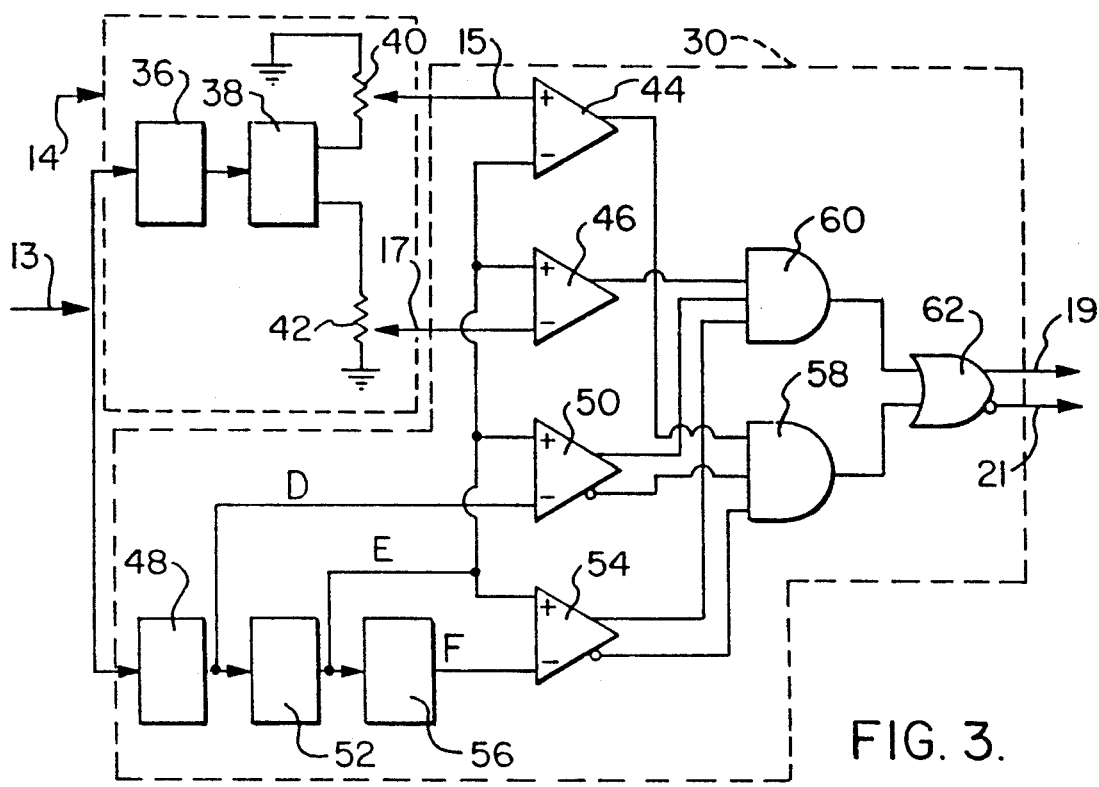
FIGS. 3 and 4 are detailed circuit diagrams of the apparatus illustrated in FIG. 1.
Figure 4:
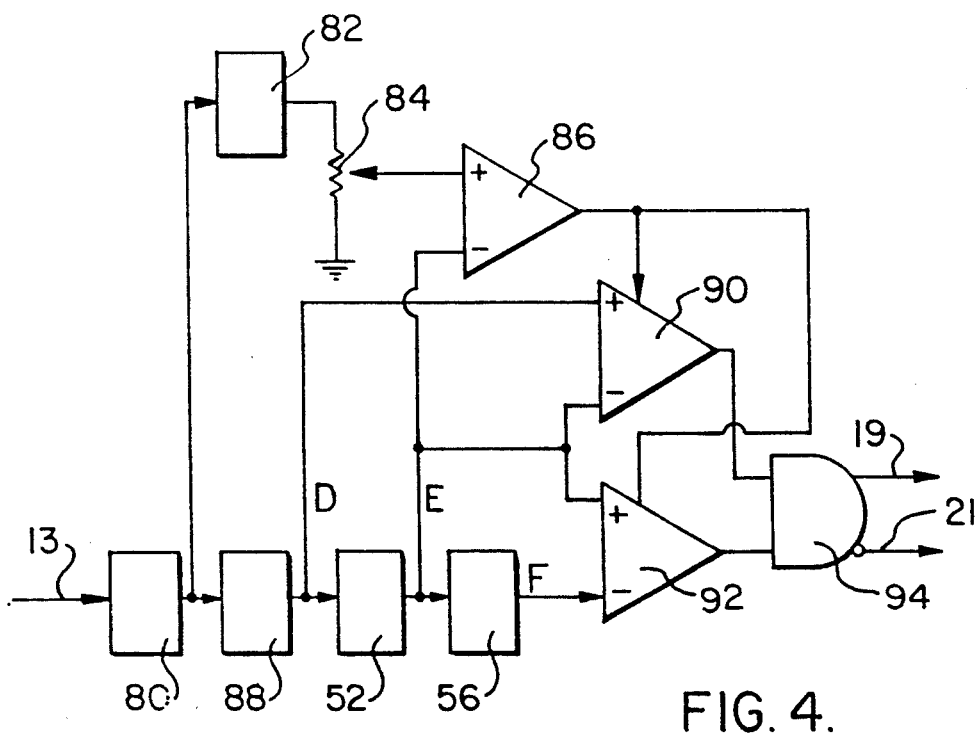

FIGS. 3 and 4 illustrate a detailed embodiment of sampling detector 16. In FIG. 3, the equalized read signal on lead 13 is applied to threshold generator 14 which consists, for example, of a full wave rectifier 36 with output low pass filter which rectifies the equalized read signal, holds the peak value of the signal and applies it to buffer 38. The rectified signal from buffer 38 is applied to threshold generators 40 and 42 to provide attenuated equalized read signals on leads 15 and 17, respectively, which signals are the positive and negative thresholds for positive and negative amplitude pulse signals received on lead 13. Sampling detector 16 in FIGS. 1 and 2 includes in FIG. 3 a buffer amplifier 48 which receives the equalized read signal from lead 13. The signal output by buffer 48 is a real time signal that is supplied to the negative input of comparator 50 and to the input of a first delay circuit 52. The first delay circuit 52 serves to delay the received signal by a predetermined amount, which once delayed signal is output to second delay circuit 56 and comparators 44, 46, 50 and 54. Second delay circuit 56 serves to delay the once delayed signal by a second amount equal in time to that delay provided by first delay circuit 52. The twice delayed signal output by delay circuit 56 is provided to the negative input of comparator 54.

Figure 5:
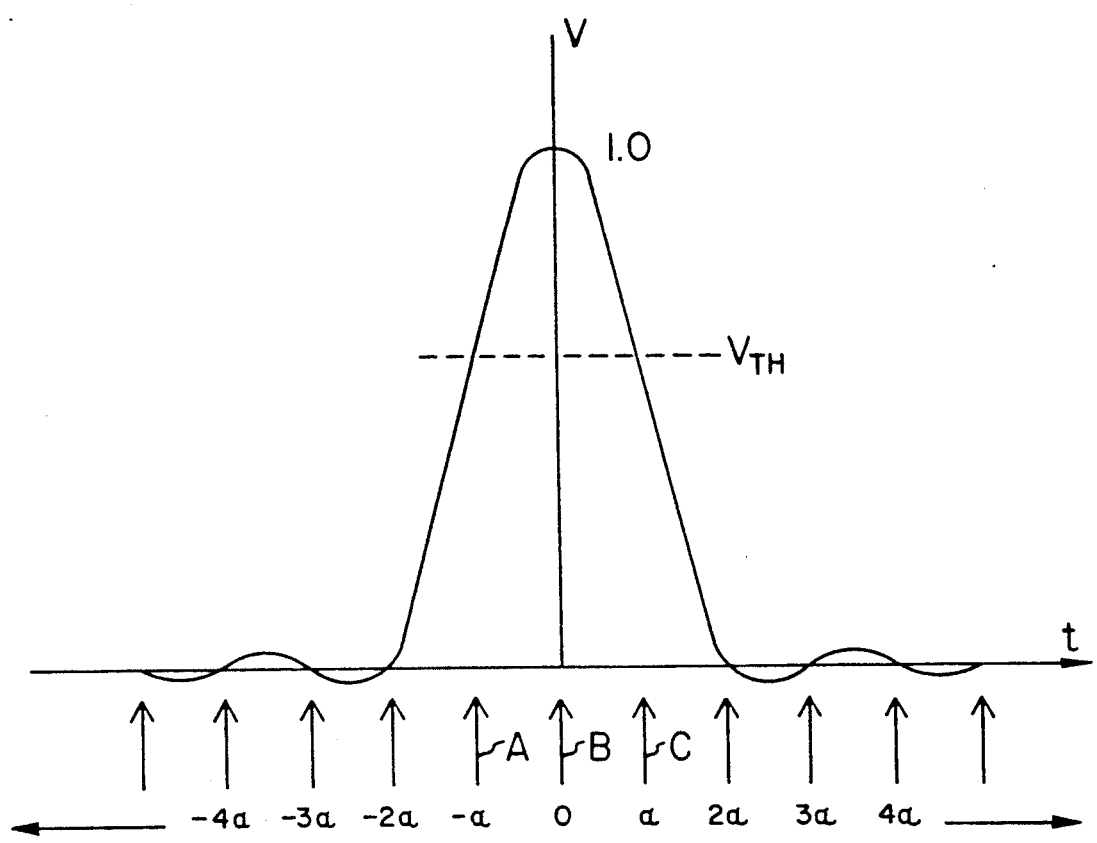
FIG. 5 is a chart that illustrates a typical equalized read signal for an isolated reversal of magnetic field orientation.

Therefore, the first delay circuit 52 and second delay circuit 56 operate in conjunction with buffer 48 to produce three delayed in time versions or replicas D, E and F of the equalized read signal appearing on lead 13 (waveform illustrated in FIG. 5). The sample times A and C illustrated in FIG. 5 are the times when the output of gate 60 transitions between states when the read signal pulse on lead 13 is of positive polarity and when the output of gate 58 transitions between states when the read signal pulse on lead 13 is of negative polarity, respectively.

Comparators 44, 46 compare the once delayed signal (E) with the positive and negative thresholds, respectively, as applied by threshold generator 14 via leads 15, 17 respectively. Similarly, comparators 50, 54 compare the magnitude of the once delayed signal (E) with the magnitude of the presently received signal (D) and the twice delayed signal (C), respectively. The transition of comparator 46 occurs between the transitions of comparators 50, 54 while the transition of comparator 44 occurs between the transitions of comparators $\overline{50}$ and $\overline{54}$. This creates the delay relationship to alpha. The results of these comparisons are applied to AND gates 58, 60 to identify the presence of a negative or positive pulse, respectively. The presence of a valid pulse is identified when the once delayed signal exceeds a predetermined threshold and the once delayed signal is greater in magnitude than the present signal and the twice delayed signal. OR gate 62 receives the output of AND gates 58, 60 to produce a logic signal on lead 19 indicative of the presence or absence of a valid pulse on lead 13.

Alternative Embodiment of Sampling Detector

FIG. 4 illustrates an alternative embodiment of sampling detector 16 which uses a single threshold rather than a dual threshold detector In this embodiment, the input read signal is applied via lead 13 to rectifier 80 which includes a low pass filter to hold and then output a rectified equalized signal to buffers 82, 88. Comparator 86 compares the magnitude of the once delayed signal (E) with the single threshold signal output from variable resistor 84. Similarly, comparators 90, 92 perform the same function as comparators 50, 54 described above. Since a single threshold is used in this embodiment, only a single AND gate 94 is required to produce the logic signal indicative of the presence or absence of a valid input pulse.

While a specific embodiment of this invention has been disclosed, it is expected that those skilled in the art can and will design alternate embodiments of this invention that fall within the scope of the appended claims.

We claim:

1. In a data storage system that includes a transducer that reads data from a magnetic data storage media in the form of pulse shaped signals indicative of data written on said data storage media, apparatus for identifying the presence of said data in the signals received from said transducer comprising:
    first delay means for delaying said received signal a first predetermined time;
    second delay means for delaying said once delayed received signal a second predetermined time;
    means responsive to said once delayed received signal exceeding a predetermined threshold and said once delayed received signal being greater in magnitude than both said twice delayed received signal and said received signal for producing a data signal indicative of the presence of said data pulse.

2. The apparatus of claim 1 wherein said producing means includes:
    means for detecting when said once delayed received signal exceeds a predetermined threshold;
    means for determining whether said once delayed received signal is greater in magnitude than both said twice delayed received signal and said received signal.

3. The apparatus of claim 1 further including:
    means for generating a clock signal of variable frequency;
    means for outputting a data pulse signal in response to said produced data signal and in synchronization with said clock signal.

4. The apparatus of claim 3 further including:
    equalizer means for mitigating the effect of noise on said received signals;
    threshold means interposed between said equalizer means and said first delay means for attenuating said received signal.

5. The apparatus of claim 4 further including:
    differentiating detector means responsive to said received signals for outputting a pulse signal to said generating means in response to peaks in said received pulse shaped data signal to control the frequency of said generating means.

6. The apparatus of claim 4 further including:
    means for coupling said produced data signal to said generating means to control the frequency of said generating means.

7. The apparatus of claim 1 wherein said first predetermined time and said second predetermined time are equal in duration.

8. The apparatus of claim 1 further including:
    means, responsive to said data signal, for generating a clock signal directly from said data signal.

9. In a data storage system that includes a transducer that reads data from a magnetic data storage media in the form of pulse shaped signals indicative of data written on said data storage media, apparatus for identifying the presence of said data in said signals received from said transducer comprising:
    means for receiving said signals from said transducer;
    first delay means for delaying each said received signal a first predetermined time;
    second delay means for delaying said once delayed received signal a second predetermined time;
    means for detecting when said once delayed received signal exceeds a predetermined threshold;
    means for determining whether said once delayed received signal is greater in magnitude than both said twice delayed received signal and said received signal;
    means connected to said detecting means and said determining means and responsive to said once delayed received signal exceeding said predetermined threshold and said once delayed received signal being greater in magnitude than both said twice delayed received signal and said received signal for producing a data signal indicative of the presence of said data pulse.

10. The apparatus of claim 9 further including:
    means for generating a clock signal of variable frequency;
    means for outputting a data pulse signal in response to said produced data signal and in synchronization with said clock signal.

11. The apparatus of claim 10 further including:
    equalizer means for mitigating the effect of noise on said pulse shaped signals;
    threshold means interposed between said equalizer means and said first delay means for attenuating said received signal.

12. The apparatus of claim 11 further including:
    differentiating detector means responsive to said received signals for outputting a pulse signal to said generating means in response to peaks in said received data signal to control the frequency of said generating means.

13. The apparatus of claim 11 further including:
    means for coupling said produced data signal to said generating means to control the frequency of said generating means.

14. The apparatus of claim 9 wherein said first predetermined time and said second predetermined time are equal in duration.

15. The apparatus of claim 9 further including:
    means, responsive to said data signal, for generating a clock signal directly from said data signal.

16. The method of claim 15 further including the step of:
- generating a clock signal of variable frequency;
- outputting a data pulse signal in response to said produced data signal and in synchronization with said clock signal.

17. In a data storage system that includes a transducer that reads data from a magnetic data storage media in the form of pulse shaped signals indicative of data written on said data storage media, apparatus for identifying the presence of said pulse shaped data signals in the signals received from said transducer comprising:
- means for receiving said signals from said transducer;
- first delay means for delaying each said received signal a first predetermined time;
- second delay means for delaying said once delayed received signal a second predetermined time;
- means for detecting when said once delayed received signal exceeds a predetermined threshold;
- means for determining whether said once delayed received signal is greater in magnitude than both said twice delayed received signal and said received signal;
- means connected to said detecting means and said determining means and responsive to said once delayed received signal exceeding said predetermined threshold and said once delayed received signal being greater in magnitude than both said twice delayed received signal and said received signal for producing a data signal indicative of the presence of said data pulse;
- means for generating a clock signal of variable frequency;
- means for outputting a data pulse signal in response to said produced data signal and in synchronization with said clock signal;
- equalizer means for mitigating the effect of noise on said received signals;
- threshold means interposed between said equalizer means and said first delay means for attenuating said received signal;
- differentiating detector means responsive to said received signals for outputting a pulse signal to said generating means in response to peaks in said received data signal to control the frequency of said generating means.

18. The method of claim 17 further including the steps of:
- mitigating the effect of noise on said received signals;
- attenuating said received signals.

19. In a data storage system that includes a transducer that reads data from a magnetic data storage media in the form of pulse shaped signals indicative of data written on said data storage media, a method of identifying the presence of said pulse shaped signals in the signals received from said transducer comprising the steps of:
- receiving said signals from said transducer;
- delaying each said received signal a first predetermined time;
- delaying said once delayed received signal a second predetermined time;
- detecting when said once delayed received signal exceeds a predetermined threshold;
- determining whether said once delayed signal is greater in magnitude than both said twice delayed received signal and said received signal;
- producing a data signal indicative of the presence of said data pulse when said once delayed signal exceeds a predetermined threshold and said once delayed signal is greater in magnitude than both said twice delayed received signal and said received signal.

20. The method of claim 19 including the step of:
- generating a clock signal directly from said data signal.

21. In a data storage system that includes a transducer that reads data from a magnetic data storage media in the form of pulse shaped signals indicative of data written on said data storage media, apparatus for identifying the presence of said pulse shaped signals in the signals received from said transducer comprising:
- first means for measuring said received signal at a first predetermined time;
- second means for measuring said received signal at a second predetermined time;
- third means for measuring said received signal at a third predetermined time;
- means responsive to said received signal exceeding a predetermined threshold at said second predetermined time and said received signal at said second predetermined time being greater in magnitude than said received signal at both said first and third predetermined times for producing a data signal indicative of the presence of said data pulse.

22. The apparatus of claim 21 wherein said second means includes:
- delay means for delaying said received signal a first predetermined length of time.

23. The apparatus of claim 22 wherein said third means includes:
- delay means for delaying said once delayed received signal a second predetermined length of time.

24. The apparatus of claim 21 further including:
- phase locked loop means for generating a clock signal of variable frequency;
- means for outputting a data pulse signal in response to said produced data signal and in synchronization with said clock signal.

25. The apparatus of claim 24 further including:
- equalizer means for mitigating the effect of noise on said signals to produce a symmetrical pulse shaped signal having minimum combined noise and intersymbol interference at specified times;
- threshold means interposed between said equalizer means and said first delay means for attenuating said symmetrical pulse shaped signal.

26. The apparatus of claim 25 further including:
- differentiating detector means responsive to said received signals for outputting a pulse signal to said generating means in response to peaks in said received signals to control the frequency of said generating means.

27. The apparatus of claim 25 further including:
- means for coupling said produced data signal to said generating means to control the frequency of said generating means.

28. The apparatus of claim 22 wherein said first predetermined time and said third predetermined time are different from said second predetermined time by amounts that are equal in magnitude.

29. The method of claim 28 further including the steps of:
- generating a clock signal of variable frequency;
- outputting a data pulse signal in response to said produced data signal and in synchronization with said clock signal.

30. In a data storage system that includes a transducer that reads data from a magnetic data storage media in the form of pulse shaped signals indicative of data written on said data storage media, a method of identifying the presence of said pulse shaped signals in the signals received from said transducer comprising the steps of:

measuring said received signal at a first predetermined time;

measuring said received signal at a second predetermined time;

measuring said received signal at a third predetermined time;

producing a data signal indicative of the presence of said data pulse in response to said received signal exceeding a predetermined threshold at said second predetermined time and said received signal at said second predetermined time being greater in magnitude than said received signal at both said first and third predetermined times.

31. The method of claim 30 further including the steps of:

mitigating the effect of noise on said received signals to produce a symmetrical pulse shaped signal having minimum combined noise and intersymbol interference at specified times;

attenuating said symmetrical pulse shaped signal.

* * * * *